Patented Dec. 13, 1927.

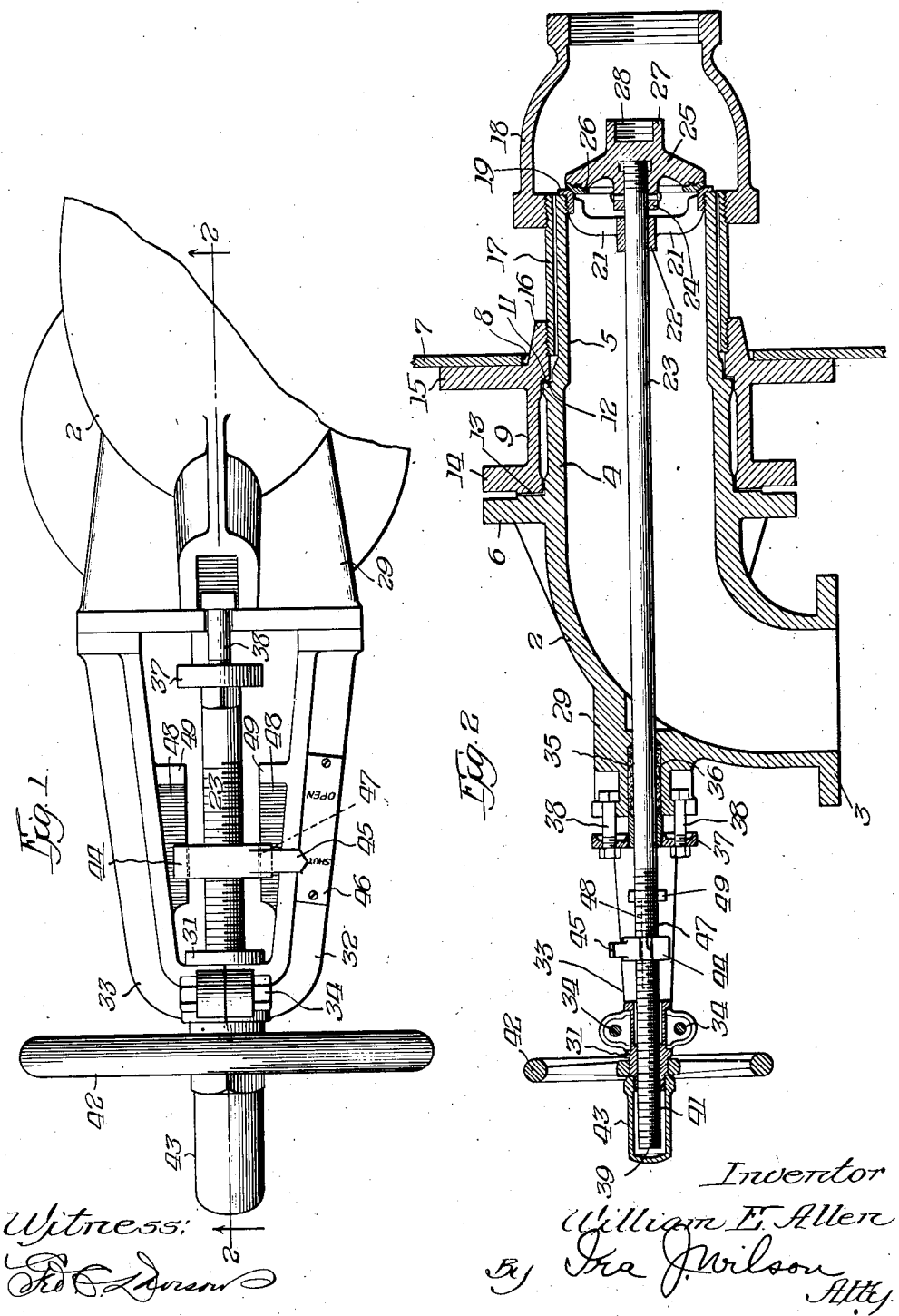

1,652,510

UNITED STATES PATENT OFFICE.

WILLIAM E. ALLEN, OF BRIDGEPORT, CONNECTICUT, ASSIGNOR TO CRANE CO., OF CHICAGO, ILLINOIS, A CORPORATION OF ILLINOIS.

TANK DRAIN VALVE.

Application filed June 6, 1927. Serial No. 196,724.

The invention relates to fluid control valves for tanks and the like and particularly to a valve of the so-called 'anti-freeze' character now largely in demand for outdoor or exposed oil or water storage tanks.

Most liquid storage tanks feed from or adjacent their bottoms but whether the feed or drain connection be so located, or located elsewhere, it is desirable in many instances to place a valve in the feed or drain line at or closely adjacent the tank. The reasons for this will be obvious. However, when the tank and valve are out of doors, that is, exposed to the weather, it sometimes happens that the valve, for one reason or another, cannot be tightly closed, as for instance when ice accumulates or lodges in the valve. Tar and sedimentary deposits accumulating in the bottoms of the tanks also work their way into the valve and its operating parts and present similar and additional difficulties.

A number of tank drain valves have been devised but most of them are complicated and expensive to manufacture, install and maintain, or are wholly unsatisfactory for cleaning, grinding, replacement or repair, for numerous reasons, too many to be particularized here. As it is very desirable, in a valve for the purposes specified, to have the greatest simplicity of construction and operation without sacrifice of the requisite strength and necessary functions, and a construction embodying features of quick and easy accessibility for inspection, cleaning etc., it will be appreciated that many of the prior kinds of non-freeze valves do not offer a satisfactory solution of the problems.

Consequently one of my primary purposes is to provide a simple and comparatively cheap but strong valve of the anti-freeze type which may be quickly and easily connected to and disconnected from a water, oil or other tank or the like through the wall thereof and so arranged that the operating parts will be located interior of the tank where the danger of freezing or injury is minimized.

Another object is to provide a valve fitting arrangement adapted to be attached to and through the wall of the tank or other receptacle in order to facilitate installation and removal of the valve. The fitting, in the embodiment used for illustration, is made in the form of a flanged sleeve adapted to be attached to and through the tank wall in a more or less permanent manner.

Another object is to provide a guard for the inner end and working parts of the valve so as to protect them from accumulating tar, sediment etc. normally settling toward the bottom of the tank and so to arrange the guard that, while it is readily removable with or independently of the aforesaid fitting, it will normally remain in place whether the valve itself be removed or not.

A further object is to provide a valve having an arrangement whereby an operator may grind the seat surfaces without dismantling the valve or taking it apart, or, if desired, without removing the valve from the tank.

Many further objects including the provision of an indicator to show when the valve is open and shut, a guard for the stem end threads for a rising-stem type of valve, and other novel features, as well as the advantages and uses, will or should become apparent from the following description and claims, and from the drawing, in which:

Fig. 1 is a fragmentary plan view of a valve embodying the invention, and

Fig. 2 is a sectional view taken along the line 2—2 of Fig. 1, but on a reduced scale.

The invention is preferably embodied in a valve of the anti-freeze type of which that of the patent to Harnett 928,047 will serve as an example. The valve illustrated is of the rising-stem type and preferably also has an elbow-shaped or spigot-type body. An elbow or spigot type body is indicated generally at 2 and terminates at its end outward of the tank in a flange 3 for coupling to a service pipe or the like, although other coupling arrangements may be used. The opposite end of the elbow is elongated to provide a stepped sleeve the portions of which are generally designated 4 and 5, while between the stepped portion 4 and the elbow a circumferential flange 6 is provided for a purpose to be described.

A tank wall or the like is generally designated at 7 and is provided with a suitable aperture 8 through which the elongated end of the valve body, that is, the portion 5 is adapted to project interior of the tank. In order that the valve body and operating parts may be quickly attached and removed from the tank a sleeve fitting generally designated 9 is adapted to receive the stepped portion 4 and to position the same through the interengagement of shoulders 11 and 12 formed on the fitting and body respectively, as well as through the interengagement of a shoulder 13 formed on a flange 14 of the fitting with a like shoulder or surface formed on the flange 6 on the body. The fitting 9 is also provided with a wide circumferential flange 15 adapted to abut against and be riveted or bolted to the wall 7 of the tank or the like, and in addition, has a circumferential projection 16 which extends through the opening 8 to the interior of the tank for a purpose to be described. The fitting 9 may first be connected to the tank wall in a more or less permanent manner and the valve body thereafter positioned therethrough and secured thereto by bolts or the like (not shown) passing through the flanges 6 and 14. Gaskets may be positioned between the abutting shoulders of the fitting and body, if desired.

The circumferential projection 16 is preferably internally threaded for the reception of a sleeve 17 adapted to closely fit about the stepped sleeve portion 5 of the body and to terminate at its interior end substantially flush with the interior end of the portion 5 of the body. The interior end of the sleeve 17 is preferably threaded exteriorly for threaded engagement with a guard member or nipple 18 which serves as a working chamber and protector for the working parts of the valve which are located interior of the tank. By reason of this construction the valve body together with its operating parts may be wholly withdrawn from the tank or the like without disturbing the fitting 9 or the sleeve and guard 17 and 18 respectively, and attachment of the valve and its removal for any purpose, such as for repair, cleaning, grinding, or replacement, is greatly facilitated.

The interior end of the portion 5 of the body is preferably threaded internally for the reception of an externally threaded valve seat member 19, which in the illustration is integral with a spider 21, which at its central portion 22 provides a bearing for a rising valve stem 23, which at this end is threadedly engaged within and pinned to a boss 24 formed on a valve closure member 25. The closure member 25 is provided with a circumferential seat 26 adapted to engage the seat member 19 and with a second boss 27 which is centrally drilled or cored out and threaded, as shown at 28, for the reception of the threaded end of a grinding mechanism utilized for grinding and fitting the seats to one another. When the stem is moved longitudinally to the right, viewing Fig. 2, by mechanism to be described, the valve 25 is moved inwardly of the tank away from the seat member 19 and travels in the chamber formed by the guard 18 which guards it from a large portion of sedimentary deposits and the like that would otherwise tend to accumulate upon it and between the seat surfaces. When the valve is closed the pressure of the fluid behind it tends to keep it tight against its seat and thereby minimizes the chance of leaking.

The stem 23 projects through the body to the bend of the elbow where it projects through the wall and through an apertured boss 29 formed exteriorly thereon and through an internally threaded bushing 31 secured for rotation but against longitudinal movement between yoke arms 32 and 33. The yoke arms are secured together as by bolts 34 and to the boss 29 in any suitable manner, while packing 35 in a stuffing box 36 in the boss and held in place by an adjustable packing gland 37 in turn secured to the boss by bolts 38, serves to prevent fluid from leaking along the stem through the boss. This construction is very similar to prior arrangements for the same purpose.

The outer end 39 of the steam is threaded, as shown at 41, and threadedly engages with the interior threads of the bushing 31 to which a hand wheel or other operating member 42 is rigidly secured. Preferably a cap guard 43 is removably secured to the outer end of the bushing 31 for protection of the threads of the stem. When the hand wheel or other operating member 43 is turned in one direction or the other it moves longitudinally to open or close the valve, as the case may be.

In order to show when the valve is open and when it is shut and to provide a stop for the valve in its proper open position, a collar 44 is secured to or made integral with the stem 23 intermediate the bushing and the packing gland. This collar 44 is provided with an indicator finger 45 adapted to project over and adjacent one of the yoke arms on which a plate 45 bearing legends "Shut" and "Open" is secured, as more clearly indicated in Fig. 1. The collar 44 is also slotted, as shown at 47, on diametrically opposite sides for the reception of guides 48 formed integral with the yoke arms. These guides prevent the stem from rotating and terminating in abutments 49 adapted to engage the collar 44 and limit the movement of the stem on opening movement of the valve.

While I have shown and described what is at present a preferred form of the invention and a preferred type of valve for its embodiment, it will be appreciated that it is susceptible of wide variation and modification and of incorporation in other types of valve. For these reasons I do not desire to be limited except by the spirit of the invention and the scope of the appended claims.

I claim:

1. In a valve of the character described, an elbow body having a positioning and securing flange on its exterior intermediate its ends and adapted at one end to project through a tank wall and be positioned with respect and secured to the tank wall by means of said flange, means connected to the end projecting through said wall providing a stem bearing and a valve seat, a second stem bearing formed in the wall of said body at the elbow and aligned with the first said bearing, a longitudinally movable stem mounted in said bearings, a valve closure on the inner end of said stem and movable therewith inward of the tank to open the valve and in the opposite direction to said valve seat to close the valve, means independent of but surrounding the inner end of said body, seat and closure for guarding the same, and means for moving said closure to open and closed positions.

2. A tank valve of the character described comprising, an elbow body having one end elongated and adapted to project through a tank wall and within the tank, a sleeve-like fitting adapted to receive and surround a portion of said elongated end, a pair of parallel spaced and outwardly directed flanges on said fitting, one of said flanges being adapted to abut against and be secured to the wall of the tank about the valve opening therethrough, a flange on said body adapted to abut against and be secured to the other flange on said fitting, a valve seat secured to the elongated end of said body, a closure member co-operative with said seat, said seat and closure member being arranged so that said closure member when moved inwardly of the tank will open the valve, a valve stem connected to said closure member and projecting through the wall of the body at the elbow, and means for moving said stem to move said closure member to open and closed positions.

3. A tank valve of the character described comprising, a valve body having a substantially cylindrical end portion adapted to be projected freely through a tank wall and within the tank, a sleeve-like fitting adapted to receive and surround a portion of said cylindrical portion of the body, said fitting being secured to the exterior side of the tank wall and removably secured to said valve body so that upon release of said fitting from said body the body may be removed bodily from the tank, a valve seat secured at the interior end of said cylindrical portion of said body, a closure member cooperative with said seat, said seat and closure member being arranged so that said closure member when moved inwardly of the tank will open the valve, a valve stem connected to said closure member and projecting through the wall of the body to the exterior thereof, means for moving said stem to move said closure member to open and close the valve, and guard means surrounding said closure member and seat and secured to said fitting.

4. A tank valve of the character described comprising, a valve body having an end portion adapted to be projected freely through an opening in a tank wall and within the tank, a sleeve-like fitting secured to the tank wall at said opening and adapted to freely receive and surround a part of the end portion of the valve body, a shoulder on said fitting outwardly of the tank wall, a positioning and securing shoulder on said valve body abutting against the shoulder on said fitting and removably secured thereto, a valve seat secured at the interior end of the end portion of said body and of less diameter than the external transverse over-all dimensions of said end portion of the body, a closure member cooperative with said seat and likewise of less diameter than the overall transverse dimensions of said end portion of the body, whereby upon the release of the shoulder on said body from the shoulder on said fitting said body, valve seat and closure member may be removed bodily and together from the tank, said seat and closure member being arranged so that said closure member when moved in one direction will open the valve and in the opposite direction will close the valve, a valve stem connected to said closure member and projecting through the wall of the body to the exterior thereof, and means for moving said stem to move said closure member to open and close the valve.

In witness of the foregoing I affix my signature.

WILLIAM E. ALLEN.